US012448837B2

(12) United States Patent
Garcia Garcia

(10) Patent No.: US 12,448,837 B2
(45) Date of Patent: Oct. 21, 2025

(54) COVERING BOX AND HOOD FOR ROLLER ELEMENTS

(71) Applicant: Bandalux Industrial, S.A., Moraña (ES)

(72) Inventor: Emiliano Garcia Garcia, Moraña (ES)

(73) Assignee: Bandalux Industrial, S.A., Moraña (ES)

( * ) Notice: Subject to any disclaimer, the term of this patent is extended or adjusted under 35 U.S.C. 154(b) by 268 days.

(21) Appl. No.: 18/047,262

(22) Filed: Oct. 17, 2022

(65) Prior Publication Data

US 2023/0118693 A1 Apr. 20, 2023

(30) Foreign Application Priority Data

Oct. 20, 2021 (ES) ............................ ES202132049U

(51) Int. Cl.
*E06B 9/42* (2006.01)

(52) U.S. Cl.
CPC ...................................... *E06B 9/42* (2013.01)

(58) Field of Classification Search
CPC .... E06B 9/42; E06B 9/17007; E06B 9/17015; E06B 9/17023; E06B 2009/17084; E06B 9/1703
See application file for complete search history.

(56) References Cited

U.S. PATENT DOCUMENTS 7,441,582 B2 * 10/2008 Lukos ........................ E06B 9/42 160/242
2020/0208464 A1 * 7/2020 Guest ..................... E06B 9/1703
2023/0349229 A1 * 11/2023 Sundelin ............. E06B 9/17007

FOREIGN PATENT DOCUMENTS

AT 399200 B * 2/1995 ......... E06B 9/17015
DE 2262249 C2 * 12/1972
EP 1674653 A2 * 6/2006 ......... E06B 9/17015
ES 2526256 A1 1/2015
ES 1283963 U * 12/2021 ............... E06B 9/42

* cited by examiner

*Primary Examiner* — Abe Massad
(74) *Attorney, Agent, or Firm* — Thedford I. Hitaffer; Hitaffer, PLLC

(57) ABSTRACT

A covering box for roller elements, to be fixed to a wall or ceiling, comprises a casing made up of multiple walls that define an internal housing configured to receive the roller elements. A lower hood is provided with a pivot to form an axis of rotation, such that the hood is able to pivot with respect to the casing between a connected state and a disconnected state. The pivot comprises a hollow and a hook-shaped segment configured to be coupled with a segment of the hood. The hollow is defined by a vertical extension that extends from the casing and an elongated horizontal extension from which the hook-shaped segment extends vertically defining a first point of rotation for a first segment of the hood and a curved segment intended to make contact under pressure on a second segment of the hood. An elongated segment protrudes from the elongated extension that defines a second point of rotation for a third segment of the hood.

3 Claims, 5 Drawing Sheets

COVERING BOX AND HOOD FOR ROLLER ELEMENTS

CROSS-REFERENCE TO RELATED APPLICATIONS

This application claims priority to ES Application No. U 202132049, filed on Oct. 20, 2021, the disclosure of which is incorporated herein by reference in its entirety.

OBJECT OF THE INVENTION

The object of the present invention is to provide a covering box and a hood to house roller elements, such as roller blinds used in windows and doors.

More specifically, the invention proposes the development of a covering box and a hood for roller elements, as well as an assembly made up of the covering box and the hood wherein the hood can tilt in a disconnected position by means of a simple and more intuitive coupling system, such that it is not completely separated and remains linked in a hanging manner.

BACKGROUND OF THE INVENTION

Roller blind assemblies are well known essentially comprising a casing or covering box formed by a plurality of walls that define an internal housing intended to incorporate drive means (such as, for example, the axis of rotation, an electric motor and other components to carry out the movement of rolling and unrolling the blind) linked with a blind or the like.

The covering box may include an access hood located in the lower portion thereof to allow access to the inside. An example of this arrangement is described in document ES 2 526 256. However, although such an arrangement satisfactorily fulfils the performed function for connecting and/or disconnecting the hood, it is not intuitive for the user, since he or she must grasp and move the hood in different positions to ensure that the hood is, for example, in a hanging position when it is in a disconnected state, so that there is the possibility that the hood will unintentionally fall to the ground, with the consequent risk that it may be damaged or broken.

Furthermore, the applicant is currently unaware of an invention that has all the features described in this specification.

DESCRIPTION OF THE INVENTION

The present invention has been developed with the aim of providing a covering box and a hood for roller elements which is configured as a novelty within the field of application and which solves the aforementioned drawbacks, further contributing other additional advantages which will be obvious from the description below.

It is therefore a first object of the present invention to provide a covering box for roller elements, suitable to be fixed to a wall or ceiling, of the type comprising a casing made up of an upper wall and multiple lateral walls such that they define an internal housing intended to house the roller element, including a hood located in the lower portion of the casing provided with pivoting means to form an axis such that the hood is pivotable with respect to the casing between a connected state and a disconnected state, wherein the pivoting means comprise a hollow and a hook-shaped section intended to be coupled with a segment of the hood. In particular, the invention is characterised in that the hollow is defined by a vertical extension that extends from a vertical lateral wall of the casing and an elongated horizontal extension from which the hook-shaped segment extends vertically defining a first point of rotation for a first segment of the hood and a curved segment intended to make contact with a pressure force on a second segment of the hood, an elongated segment protruding from the elongated extension that is axially aligned with said elongated extension that defines a second point of rotation for a third segment of the hood.

Preferably, the vertical extension can be offset with respect to the outermost face of the vertical lateral wall, defining a recess, so that a longitudinal axis of the vertical extension is offset with respect to the positioning on the vertical axis of the aforementioned first point of rotation.

Additionally, the covering box includes coupling means comprising a recessed portion configured to be coupled with the hood, the portion being located above the hollow.

It is another object of the invention to provide a hood for a box of roller elements, which is suitable to be fixed on a wall or ceiling, of the type comprising a casing made up of an upper wall and multiple lateral walls such that they define an internal housing intended to house the roller element, the hood being suitable to be connected to the box, such that it covers a space present in the box, the hood having pivoting means that form a pivoting axis so that the hood is pivotable between a connected state and a disconnected state relative to the covering box, the hood having a plate with an internal side oriented towards the housing defined by the covering box and an external side opposite to the internal side. In particular, the invention is characterised in that the pivoting means are arranged at one end of the plate, having an extension that ends in the shape of a hook that acts as the first point of rotation with a segment of the covering box and a second point of rotation present in the extension linked with a second segment.

Additionally, the hood may include coupling means comprising a coupling branch that extends from the extension, configured to be coupled to the covering box in a connected state.

Advantageously, the end of the coupling branch has a substantially wedge-shaped widening.

The configuration of the covering box and the hood have the advantage that they facilitate the assembly operation between both components as it is quicker and easier to carry out.

It is also another object of the invention to provide a protective assembly for roller elements, suitable to be fixed to a wall or ceiling, characterised in that it comprises a covering box like the one described above and a hood like the one described above, such that in the disconnected state the angle formed by a longitudinal axis of the elongated horizontal extension of the covering box and a longitudinal axis of the hood is equal to or less than 90 degrees.

Due to this arrangement that angularly limits the position of the hood with respect to the covering box, when the hood is hanging to access the inside of the internal housing of the covering box, possible collisions with other nearby objects, such as window panes, are prevented. In this manner, operator safety during assembly is improved.

Thus, the covering box and hood for roller elements described represents an innovative structure with structural and constituent features heretofore unknown for its intended purpose, reasons which, taken together with its usefulness, provide it with sufficient grounds for obtaining the requested exclusivity privilege.

Other features and advantages of the covering box and hood for roller elements object of the present invention will become apparent from the description of a preferred but not exclusive embodiment illustrated by way of non-limiting example in the attached drawings, in which:

DESCRIPTION OF A PREFERRED EMBODIMENT

In light of the aforementioned figures, and in accordance with the adopted numbering, one may observe therein a preferred exemplary embodiment of the invention, which comprises the parts and elements indicated and described in detail below.

Furthermore, the terms first, second, third, and the like in the description and in the claims are used to distinguish between similar elements and not necessarily to describe a sequential or chronological order. The terms may be interchanged in suitable circumstances and embodiments of the invention may operate in other sequences than those described or illustrated in the present specification.

Furthermore, the terms upper, lower, up, down, and the like in the description and the claims are used for descriptive purposes and not necessarily to describe relative positions.

As can be seen, the protective assembly intended to internally house a roller blind (not shown), suitable to be fixed to a wall or ceiling, generally comprises a covering box, generally indicated with the reference (1), and a hood, generally indicated with the reference (2), which can be linked with said covering box (1), which are described in greater detail below.

Figure 1:
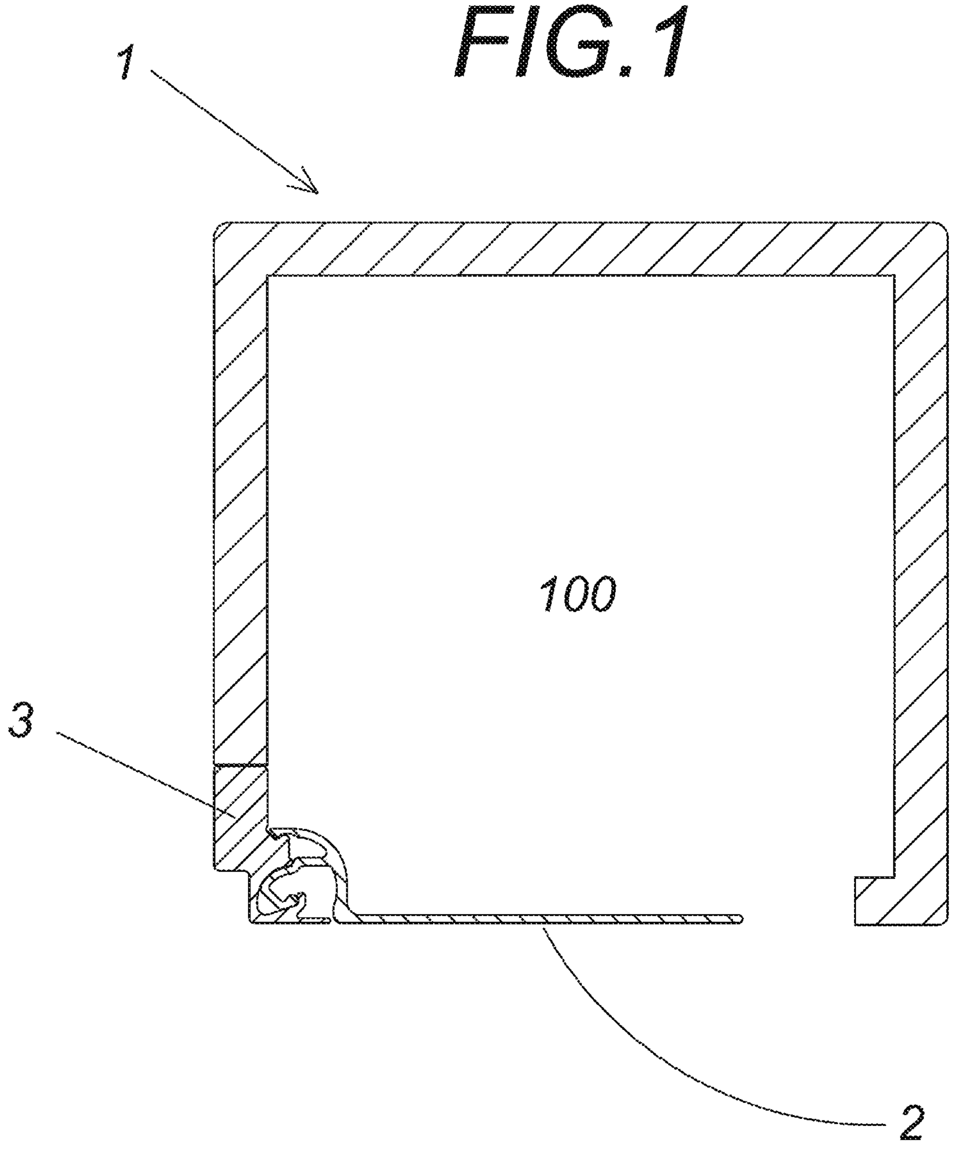
FIG. 1 is a cross-sectional view of a protective assembly for roller elements according to the invention.
Figure 2:
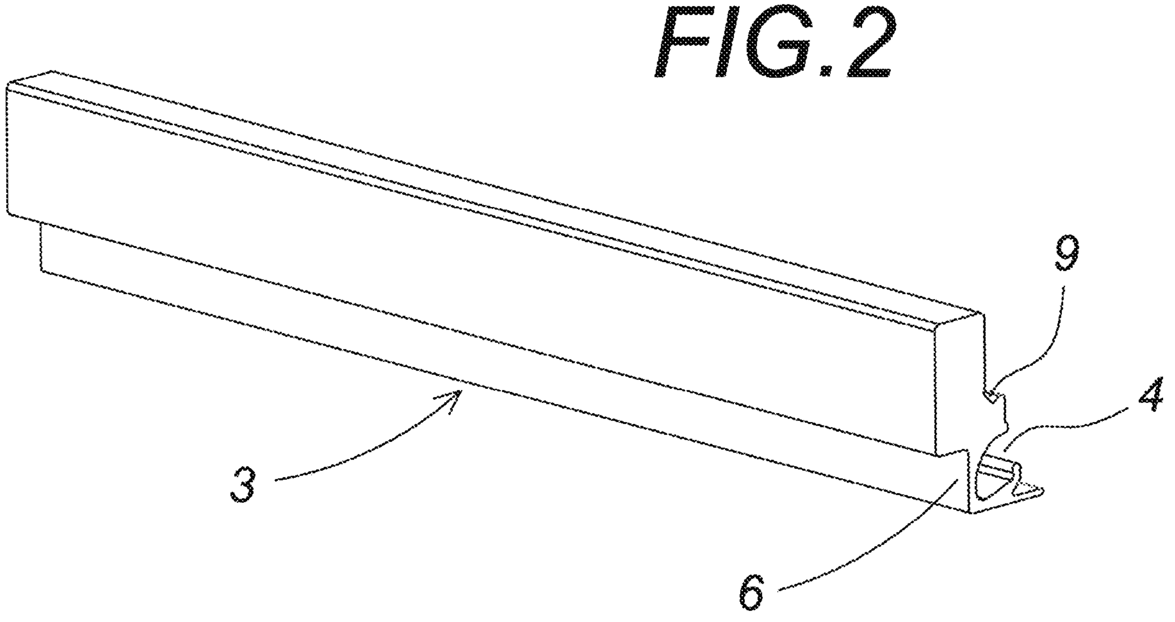
FIG. 2 is a detailed perspective view of a lower segment of a covering box according to the present invention wherein the portions that act as a "hinge" are present.
Figure 3:
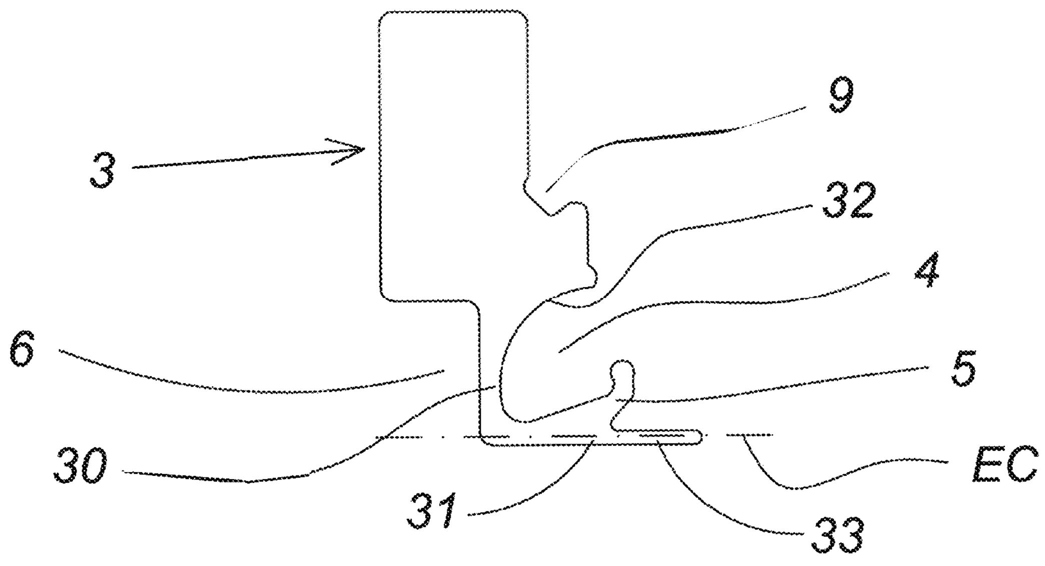
FIG. 3 is a cross-sectional elevation view of the covering box shown in FIG. 2.

Going into greater detail in the covering box (1) for roller elements, suitable to be fixed to a wall or ceiling, and according to FIGS. 1, 2 and 3, it comprises a casing (3) made up of an upper wall and multiple lateral walls such that they define an internal housing (100) intended to house the roller element, including the hood (2) located in the lower portion of the casing (3) provided with pivoting means to form an axis of rotation such that the hood (2) can pivot with respect to the casing (3) between a connected state (i.e., the hood (2) is coupled to the casing (3) in a closed position) and a disconnected state (i.e., the hood is tilted in a substantially vertical position with respect to the horizontal plane).

Specifically, the pivoting means comprise a hollow (4) and a hook-shaped segment (5) intended to be coupled with a segment of the hood that has a complementary shape, which will be described later.

The hollow (4) is defined by a vertical extension (30) that extends from a vertical lateral wall of the casing (3) and an elongated horizontal extension (31) from which the hook-shaped segment (5) extends vertically which defines a first point of rotation for a first segment of the hood and an upper curved segment (32) that is intended to make contact with a pressure force on a second segment of the hood (2) during the placement of the hood (2).

From the elongated horizontal extension (31), an elongated segment (33) protrudes axially aligned with said elongated extension (31) that defines a second point of rotation for a third segment of the hood (2).

It should be mentioned that the vertical extension (30) is offset with respect to the outermost face of the vertical lateral wall, defining a recess (6).

The covering box (1) includes coupling means comprising a recessed portion (9) configured to be coupled with a segment of the hood that has a complementary shape, said recessed portion (9) being located above the hollow (4).

Figure 4:
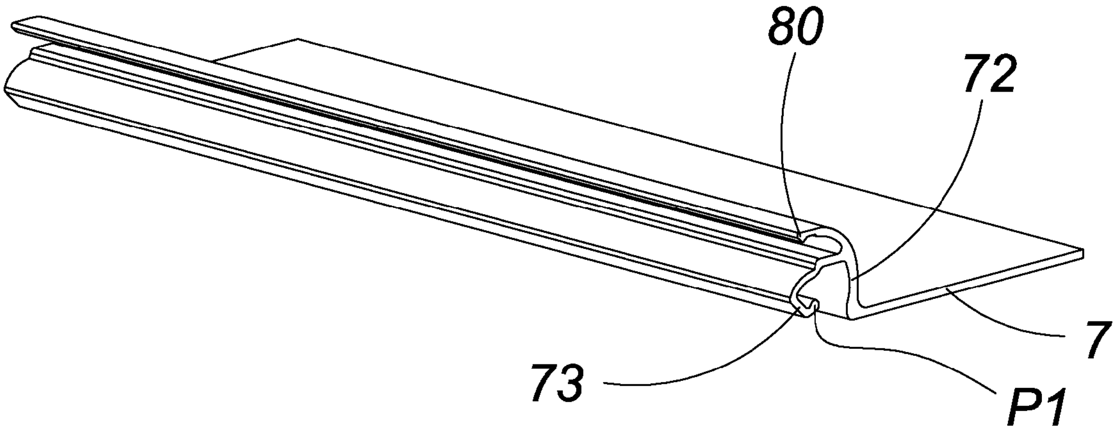
FIG. 4 is a perspective view of the hood according to the present invention.
Figure 5:
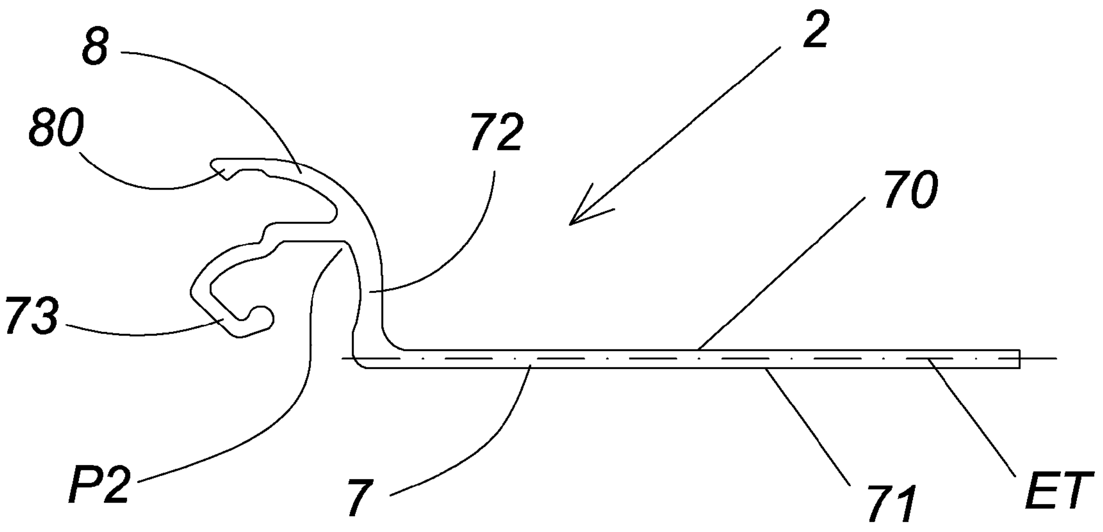
FIG. 5 is a cross-sectional elevation view of the hood shown in FIG. 4.
Figure 6:
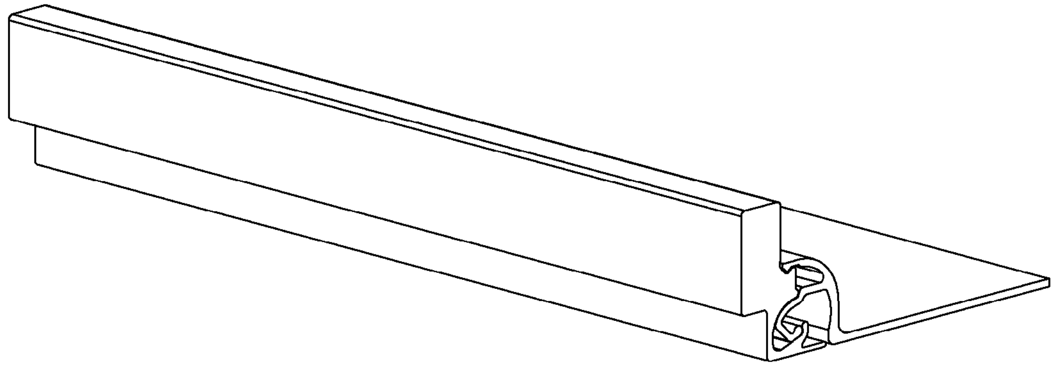
FIG. 6 is a partial perspective view of a protective assembly for roller elements according to the present invention wherein the hood is in the connected position.

Now, referring to FIGS. 4 and 5 and to the hood (2) for the previously described covering box for roller elements, the hood has a plate (7) with an internal side (70) oriented towards the housing defined by the covering box (1) and an external side (71) opposite to the internal side. Furthermore, pivoting means are provided which form a pivoting axis so that the hood is pivotable between a connected state and a disconnected state relative to the covering box (1).

As can be seen, the pivoting means are arranged at one end of the plate (7) of the hood (2), having an extension (72) that ends with a hook-shaped segment (73) that acts as the first point of rotation (P1) with a segment of the covering box (1) and a second point of rotation (P2) present in the extension (72) that is linked to a second segment.

In addition, the hood (2) also includes coupling means comprising a coupling branch (8) with a curved path and a certain flexural degree, which extends from the extension, configured to be coupled to the covering box (1) in a connected state, the end of the coupling branch having a substantially wedge-shaped widening (80) intended to be coupled to the recessed portion (9) in the connected state.

Figure 7:
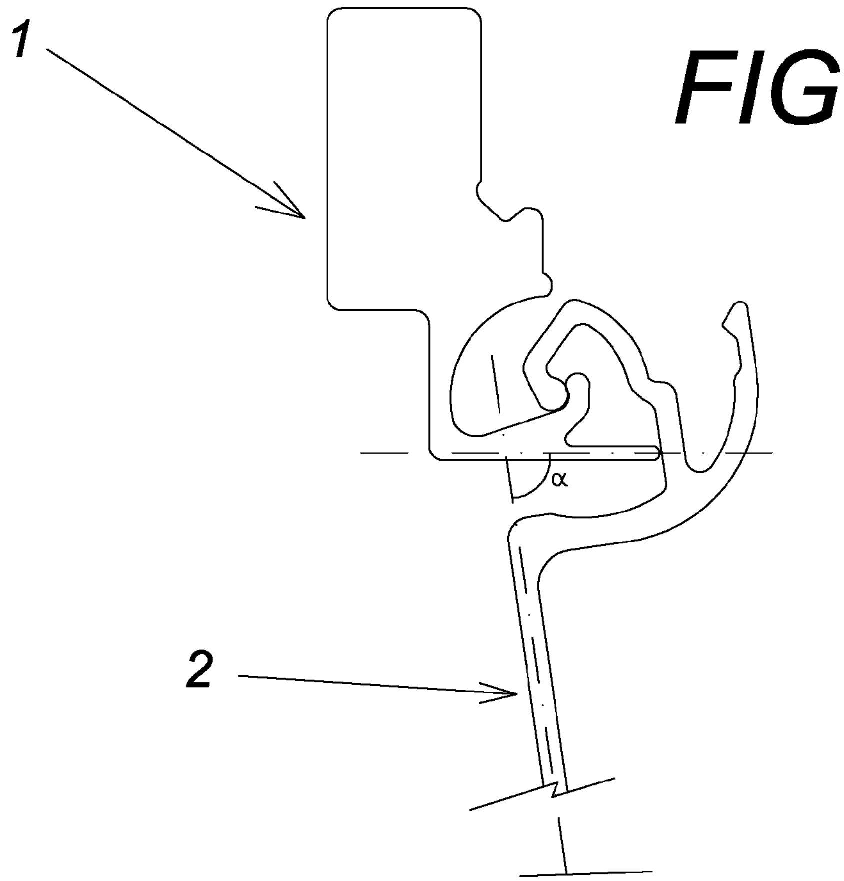
FIG. 7 is a cross-sectional elevation view showing the protective assembly in a disconnected position.

Due to the arrangement and geometry of the covering box (1) and the hood (2), in the disconnected state the angle (a) formed by a longitudinal axis (EC) of the horizontal elongated extension (31) of the covering box (1) and a longitudinal axis (ET) of the hood (2) is equal to or less than 90 degrees, such as can be appreciated in FIG. 7. In this manner, the geometric configuration of both bodies provides stop means that prevent an angle greater than 90° between the longitudinal axis (EC) and the longitudinal axis (ET) when the hood (2) adopts a hanging arrangement. Consequently, the hood (2) is prevented from causing damage to the facings or glass of a glass window or door when it is in the disconnected state, i.e., hanging.

Figure 8:
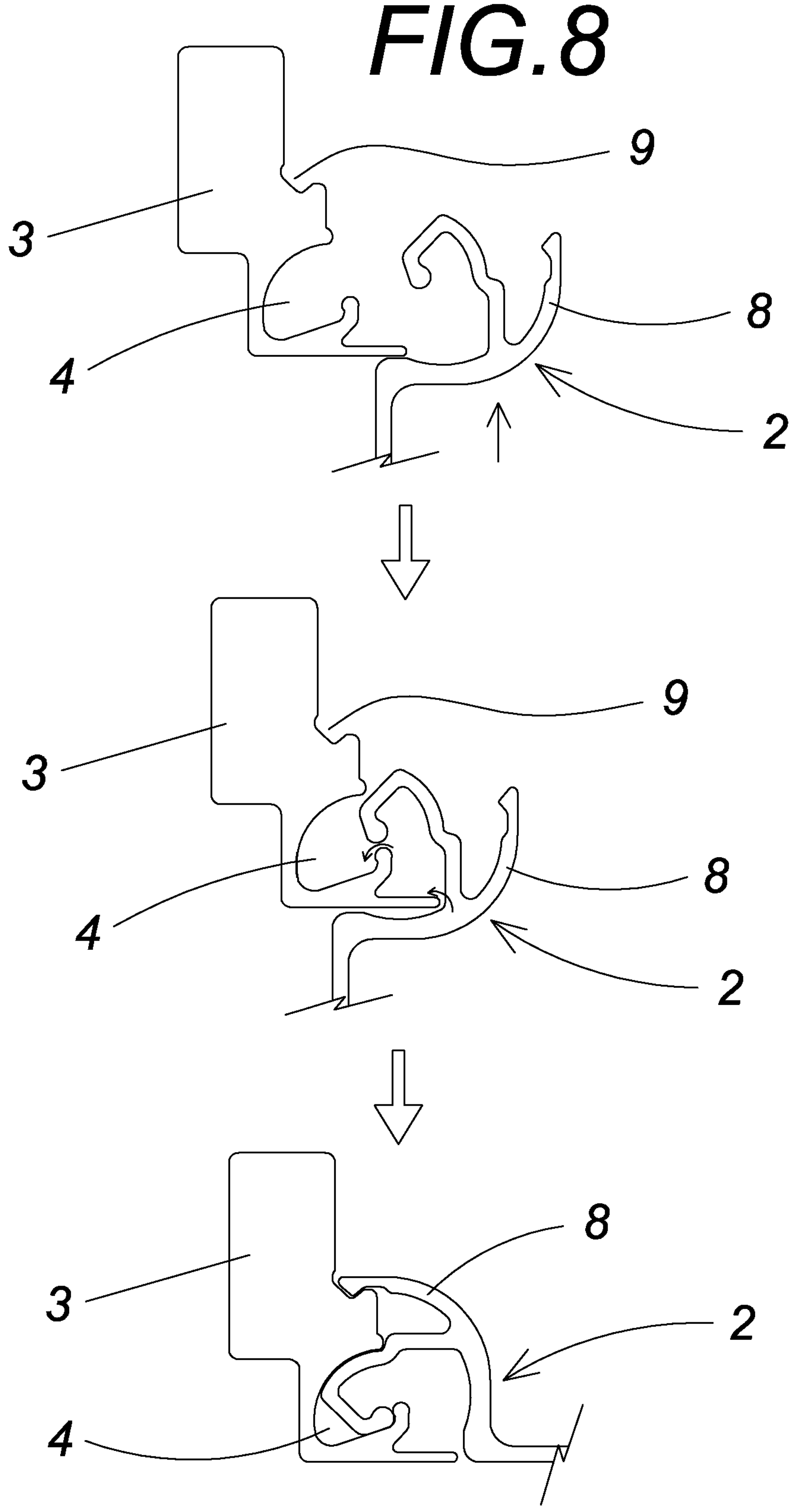
FIG. 8 is a sequential schematic view showing different phases of movement of the hood with respect to the covering box during the placement thereof.

FIG. 8 shows the different movements that have to be carried out during the assembly of the hood (2). In this manner, to place the hood (2) in the casing (3) the operator must carry out a first vertical translation movement, and then a second translation movement in a horizontal plane. Subsequently, once a portion of the hood (2) is partially housed inside the casing (3), a rotation movement is carried out such that the respective aforementioned coupling means of the covering box and the protective hood are linked together to keep the hood (2) in a horizontal plane.

The details, shapes, dimensions and other accessory elements, used to manufacture the box and hood assembly for roller elements of the invention, may be suitably substituted for others which do not depart from the scope defined by the claims which are included below.

The invention claimed is:

1. A covering box for roller elements, configured to be fixed to a wall or ceiling, comprising a casing made up of an upper wall and multiple lateral walls that define an internal housing intended to house the roller elements, a hood located in a lower portion of the casing, the casing provided with a pivot to form an axis of rotation such that the hood is pivotable with respect to the casing between a connected state and a disconnected state, wherein the pivot comprises a hollow and a hook configured to be coupled with the hood, wherein the hollow is defined by a vertical extension that extends from a vertical one of the lateral walls of the casing and an elongated horizontal extension from which the hook extends vertically, the hook, defining a first point of rotation for a first segment of the hood and a curved segment that is configured to make contact with a pressure force on a second segment of the hood, and an elongated segment protruding from the elongated extension that is axially aligned with the elongated extension and which defines a second point of rotation for a third segment of the hood, wherein the hook and the first segment of the hood form a stop with an angle formed between a longitudinal axis of the elongated horizontal extension and a longitudinal axis of the hood that is less than or equal to 90 degrees so that the hood is prevented from causing damage to the wall or ceiling to which the covering box ins configured to be fixed when pivoted to the disconnected state, and wherein the hood is suspended from the hook in the disconnected state.

2. The covering box according to claim 1, wherein a longitudinal axis of the vertical extension is offset with respect to the first point of rotation.

3. The covering box according to claim 1, further comprising a coupling comprising a recessed portion configured to be coupled with the hood, and being located above the hollow.

* * * * *